(12) United States Patent
Montoya

(10) Patent No.: US 8,580,184 B2
(45) Date of Patent: Nov. 12, 2013

(54) HOLLOW FIBER MAT WITH SOLUBLE WARPS AND METHOD OF MAKING HOLLOW FIBER BUNDLES

(76) Inventor: Jean Patrick Montoya, Ann Arbor, MI (US)

( * ) Notice: Subject to any disclaimer, the term of this patent is extended or adjusted under 35 U.S.C. 154(b) by 176 days.

(21) Appl. No.: 13/165,199

(22) Filed: Jun. 21, 2011

(65) Prior Publication Data

US 2011/0308707 A1 Dec. 22, 2011

Related U.S. Application Data

(60) Provisional application No. 61/357,060, filed on Jun. 21, 2010.

(51) Int. Cl.
*B28B 1/48* (2006.01)

(52) U.S. Cl.
USPC ........... 264/607; 264/608; 264/671; 264/277; 264/278

(58) Field of Classification Search
USPC .......................... 264/607, 608, 671, 277, 278
See application file for complete search history.

(56) References Cited

U.S. PATENT DOCUMENTS

| | | | |
|---|---|---|---|
| 3,445,321 A | 5/1969 | Groves | |
| 3,564,661 A | 2/1971 | Atwell | |
| 3,687,795 A | 8/1972 | Elkin | |
| 3,697,635 A * | 10/1972 | Dietzsch et al. | 264/135 |
| 3,722,695 A | 3/1973 | Sargent et al. | |
| 3,789,494 A * | 2/1974 | Bostrom et al. | 29/423 |
| 3,794,468 A | 2/1974 | Leonard | |
| 3,966,522 A * | 6/1976 | Hatch et al. | 264/317 |
| 4,022,692 A | 5/1977 | Janneck | |
| 4,090,002 A * | 5/1978 | Rosenblum | 264/257 |
| 4,182,582 A | 1/1980 | Youval et al. | |
| 4,213,858 A | 7/1980 | Boberg et al. | |
| 4,342,723 A | 8/1982 | Sado et al. | |
| 4,585,830 A | 4/1986 | Sweet | |
| 4,670,313 A | 6/1987 | Saudagar | |
| 4,690,844 A | 9/1987 | Saudagar | |

(Continued)

FOREIGN PATENT DOCUMENTS

| | | |
|---|---|---|
| JP | 3-30889 | 2/1991 |
| JP | 3-135422 A | 6/1991 |
| JP | 11047564 A * | 2/1999 |

OTHER PUBLICATIONS

JPO English machine translation for JP 11-047564, retrieved Feb. 7, 2013.*

*Primary Examiner* — Timothy Kennedy
(74) *Attorney, Agent, or Firm* — Gifford, Krass, Sprinkle, Anderson & Citkowski, P.C.; Douglas L. Wathen

(57) ABSTRACT

A method of forming hollow fiber bundles includes the step of providing a mat having a plurality of hollow fibers forming a weft and a plurality of soluble fibers forming a warp. Each hollow fiber extends between a first side and an opposed second side of the mat. The mat is bundled so as to form a bundle with the first side of the mat defining a first end of the bundle and the second side of the mat defining a second end of the bundle. At least a portion of the bundle is potted so as to substantially fix a position of the hollow fibers relative to each other. The soluble fibers are at least partially dissolved so as to remove the soluble fibers from the bundle.

9 Claims, 3 Drawing Sheets

(56) References Cited

U.S. PATENT DOCUMENTS

| | | | |
|---|---|---|---|
| 4,911,846 A | 3/1990 | Akasu et al. | |
| 4,957,508 A | 9/1990 | Kaneko et al. | |
| 5,002,666 A | 3/1991 | Matsumoto et al. | |
| 5,043,140 A | 8/1991 | Combs | |
| 5,096,646 A | 3/1992 | Shigemoto et al. | |
| 5,162,101 A | 11/1992 | Cosentino et al. | |
| 5,171,735 A | 12/1992 | Chien | |
| 5,188,801 A | 2/1993 | Fini | |
| 5,192,320 A | 3/1993 | Anazawa et al. | |
| 5,230,862 A | 7/1993 | Berry et al. | |
| 5,297,591 A | 3/1994 | Baurmeister | |
| 5,312,589 A | 5/1994 | Reeder et al. | |
| 5,405,695 A | 4/1995 | Akatsu et al. | |
| 5,405,698 A | 4/1995 | Dugan | |
| 5,445,771 A | 8/1995 | Degen | |
| 5,489,413 A | 2/1996 | Carson et al. | |
| 5,490,602 A * | 2/1996 | Wilson et al. | 216/56 |
| 5,565,166 A | 10/1996 | Witzko et al. | |
| 5,637,224 A | 6/1997 | Sirkar et al. | |
| 5,698,161 A | 12/1997 | Montoya | |
| 5,876,650 A | 3/1999 | Burlone et al. | |
| 5,876,667 A * | 3/1999 | Gremel et al. | 422/44 |
| 6,113,722 A | 9/2000 | Hoffman et al. | |
| 6,455,156 B1 | 9/2002 | Tanaka et al. | |
| RE41,870 E | 10/2010 | Montoya | |
| 2003/0197308 A1 | 10/2003 | Montoya | |
| 2005/0164578 A1* | 7/2005 | LoFaro et al. | 264/257 |
| 2009/0301959 A1* | 12/2009 | Tada et al. | 210/321.87 |

\* cited by examiner

HOLLOW FIBER MAT WITH SOLUBLE WARPS AND METHOD OF MAKING HOLLOW FIBER BUNDLES

CROSS REFERENCE TO RELATED APPLICATION

This utility patent application claims priority from U.S. provisional patent application Ser. No. 61/357,060, filed Jun. 21, 2010, the entire content of which is incorporated herein in its entirety.

STATEMENT OF GOVERNMENT SUPPORT

This invention was made with government support under 5 44 HL068375-07 awarded by the National Institutes of Health. The government has certain rights in the invention.

FIELD OF THE INVENTION

The present invention relates generally to the forming of hollow fiber mats and bundles, and the mats themselves.

BACKGROUND OF THE INVENTION

Hollow fibers or microtubes of different materials can be used in many applications, depending on the hollow fiber material properties. Hollow fibers can be used in mass transfer devices, if the walls of the hollow fibers are permeable, and as heat transfer devices if the walls of the hollow fibers are heat conductive. Because hollow fibers are small, their thin walls pose relatively little barrier to heat and mass transfer between the inside and outside of the hollow fiber. It also becomes possible to package a large surface area for heat and mass transfer in relatively small volumes by densely bundling multiple hollow fibers into small packages. Examples of hollow fiber bundles used in heat and mass transfer include commercially available blood oxygenators which comprise a mass transfer portion with gas permeable hollow fibers, and a heat transfer portion with a heat conducting hollow fibers.

The forming of hollow fiber bundles presents a number of challenges. Applicant's U.S. Reissue Pat. No. RE 41,870 describes a method for forming hollow fibers using a dissolvable core and a method for forming hollow fiber bundles. Applicant's U.S. patent application Ser. No. 12/915,262, filed May 12, 2011, provides another method for forming hollow fibers and for forming hollow fiber bundles. The entire contents of each of these patents and applications incorporated herein by reference, as some of the methods and descriptions therein may have utility in the present application, or may be useful in combination herewith.

Hollow fiber bundles can be easily formed by winding, packing, layering, or assembling woven, knitted, or other structured mats of hollow fibers. One advantage of using hollow fiber mats is that the spacing between adjacent hollow fibers can be controlled to ultimately achieve a desired performance goal for the hollow fiber bundle or array such as packing density or void fraction.

Hollow fiber mats can be knitted, woven, or otherwise structured such that the hollow fibers are spaced at regular or irregular intervals, with the hollow fibers being held in place by one or more inserted transverse fibers, also known as warps. In textile terms, the hollow fibers are the weft. These warps are typically multifilament yarns or the like, monofilaments, tapes, etc. However, prior art warps used in hollow fiber mats perform no heat, mass, or energy transfer function; the only function performed is to maintain controlled placement of the hollow fibers in the mat, which ultimately controls of placement of the hollow fibers in the formed bundle.

Since the warps are in direct contact with the outside surface of the hollow fibers, the warps can inhibit the performance of the hollow fibers by blocking a portion of the hollow fiber surface area, thus reducing the effective surface area available for transfer. In biological liquid contacting applications such as blood oxygenation, the warps can act as potential thrombogenic sites which can exacerbate blood clotting in the bundle; blood formed elements and proteins can deposit on and in the warps, as well as in between the warps and the hollow fibers. Similarly, in other hollow fiber applications such as wastewater processing, bioreactors, liquid contactors, and gas separators, there is the potential for a component in a fluid within the hollow fiber bundle to be adsorbed, deposited, and trapped on the warp(s), or interact negatively with the warp(s), thus reducing the performance of the hollow fibers and compromising the bundle performance.

SUMMARY OF THE INVENTION

Certain embodiments of the present invention enable the beneficial aspects of using hollow fiber mats including: maintaining controlled spacing between hollow fibers and enabling ease of bundle formation and assembly, while eliminating the negative aspects associated with the presence of the warps in the formed hollow fiber bundle, including: reduced effective functional surface area on the hollow fiber available for transfer, the potential for components in the fluid within the hollow fiber bundle or array to be deposited, adsorbed, absorbed, and trapped on the warp(s), or interact negatively with the warp(s).

In accordance with one embodiment of the present invention, a method of forming hollow fiber bundles includes the step of providing a mat having a plurality of hollow fibers forming a weft and a plurality of soluble fibers forming a warp. Each hollow fiber extends between a first side and an opposed second side of the mat. The mat is bundled so as to form a bundle with the first side of the mat defining a first end of the bundle and the second side of the mat defining a second end of the bundle. At least a portion of the bundle is potted so as to substantially fix a position of the hollow fibers relative to each other. The soluble fibers are at least partially dissolved so as to remove the soluble fibers from the bundle.

DETAILED DESCRIPTION OF THE INVENTION

The present invention provides for forming a hollow fiber bundle using a hollow fiber mat wherein the warp of the mat is formed from soluble fibers, and these fibers are at least partially dissolved and removed after the mat is formed into a bundle.

Figure 1:
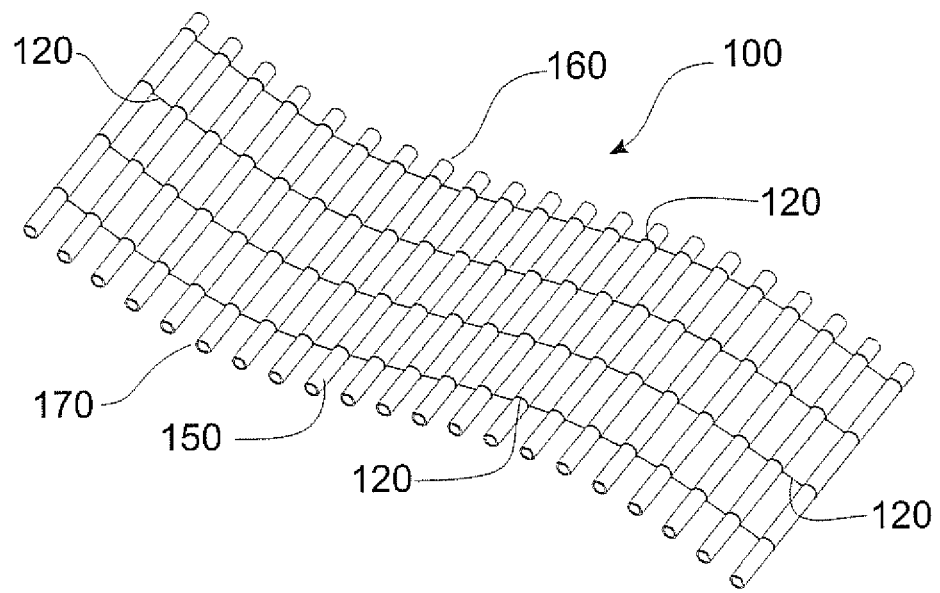
FIG. 1 is perspective view of a hollow fiber mat in accordance with an embodiment of the present invention.

FIG. 1 illustrates a knitted, woven, or otherwise structured hollow fiber mat 100 with a plurality of generally parallel hollow fibers 150 forming the weft of the mat. The warp 120 is at least partially formed of a soluble material thereby allowing for dissolving and removing the warp(s) after forming a bundle. The hollow fibers shown in FIG. 1 are generally perpendicular to the warps, however, the hollow fibers may be oriented at an angle different from 90 degrees relative to the warps, so as to form a mat of skewed hollow fibers. The mat 100 may be said to have a first side 160 and a second side 170, with the hollow fibers 150 extending between the sides 160 and 170.

Figure 2:
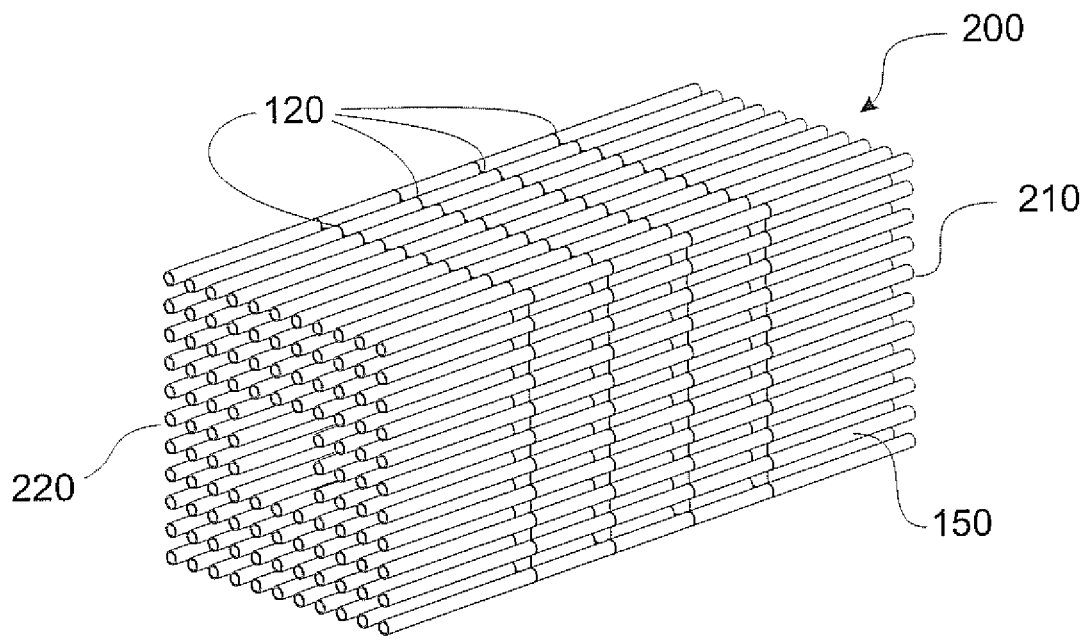
FIG. 2 is a perspective view of a hollow fiber bundle formed from at least one hollow fiber mat.

Referring to FIG. 2, at least one mat 100 with soluble warps 120 is used to form a hollow fiber bundle 200. The bundles may be formed by winding (e.g. spirally), packing, layering, or assembling at least one hollow fiber mat 100 into a bundle 200. The fiber bundle may have any shape desired such as cylindrical, cubic, or parallelepiped. Fiber bundle 200 in FIG. 2 has a generally parallelepiped shape. For the purposes of the present invention, "hollow fiber bundle" may also include a single layer array. The bundle 200 may be said to have a first end defined by the first side of the mat 100 (or multiple mats) and an opposed second end 220 defined by the second side of the mat 100 (or multiple mats).

Figure 3:
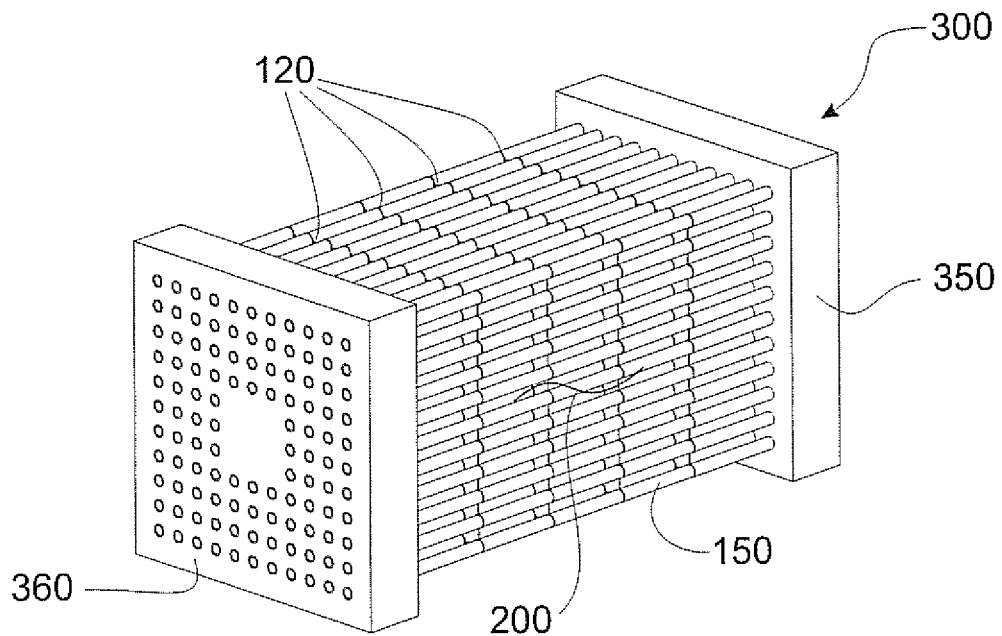
FIG. 3 is a perspective view of a hollow fiber bundle with the hollow fibers potted at each end.

One or more portions of the hollow fiber bundle or array is then potted, thereby substantially fixing the relative position of at least one end of the hollow fiber bundle in place. In FIG. 3, for example, the bundle 200 is potted at both ends to form "tube sheets", thereby sealing the hollow fibers and fixing the relative position of the hollow fibers in the bundle. Potting is typically performed within a housing or mold in order to separate a compartment in fluid communication with the inside of the hollow fibers (commonly referred to as the tube side) from a compartment in fluid communication with the outside of the hollow fibers (commonly referred to as the shell side). The housing may have an inlet and an outlet which will enable fluid flow through the bundle. In FIG. 3, the potted bundle 300 may be said to have a first potted end 350 and a second potted end 360. The material used to pot the hollow fiber may be the same as the material forming hollow fibers, or a material that bonds thereto.

Figure 4:
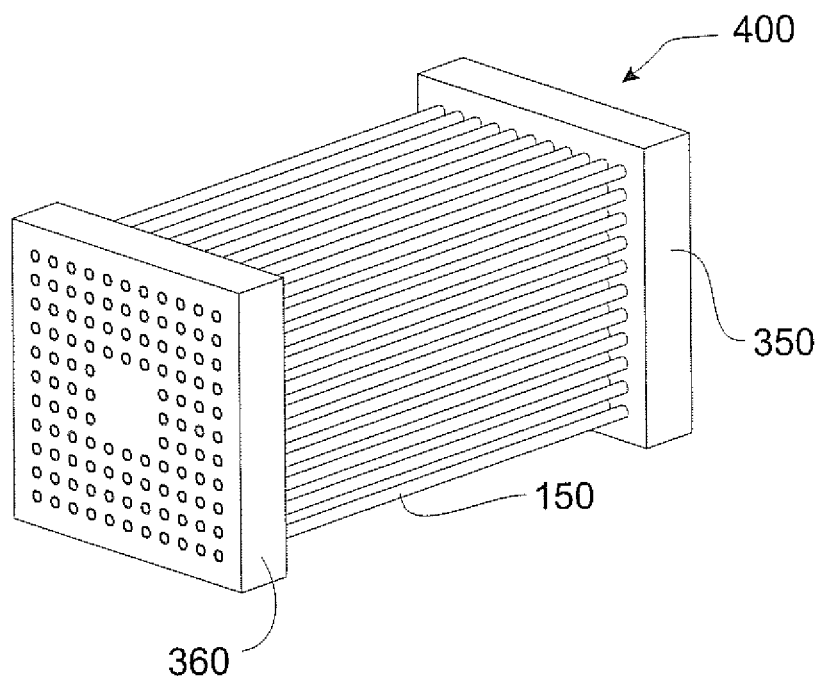
FIG. 4 is a perspective view of a hollow fiber bundle, with potted ends, after the warps have been removed in accordance with an embodiment of the present invention.

After the potted bundle is formed, the soluble warps 120 are at least partially dissolved so as to remove the warps from the bundle. In preferred embodiments, the warps are substantially dissolved using a suitable solvent to remove the warps from the bundle 300 or array, resulting in a bundle 400, shown in FIG. 4, substantially free from warps. The dissolution step can be accomplished by flowing a suitable solvent on the shell side of the bundle 300. For example if the bundle is potted within a housing, a suitable solvent can be infused or flowed through the shell side of the bundle for sufficient time to allow substantial warp dissolution. For purposes of this invention, dissolving may include substantial disintegration. The solvent and/or bundle may be heated to help with warp dissolution. Once substantially dissolved, the warp/solvent solution may be removed or purged, and if necessary exposed surfaces may be rinsed with a suitable wash fluid to remove undesired traces of the warp and solvent.

Alternatively, if the bundle is not potted in a housing, such as in a removable mold, the bundle 300 can be dipped in a suitable solution to dissolve the warps. Sequential dips in solvent and rinse may be necessary to remove the warps.

The warps may be at least partially formed from water soluble materials such as polyvinyl alcohol or a non- water soluble material such as nylon (dissolved with trifluoroethanol and acetic acid) or polystyrene (dissolved with acetone). The warps may be formed from any suitable material which can be dissolved with a suitable solvent.

It may be desirable to remove some of the warps and not others in the bundle (i.e., to retain some additional structural integrity in the bundle), so those that are desirable in the bundle should be composed from a material that is insoluble in the dissolution step. For example, a further warp may be formed from a non-soluble fiber, with non-soluble meaning that the fiber is not substantially soluble in the solvent being used to remove the soluble fiber. One of the warps 120 may be non-soluble.

Figure 5:
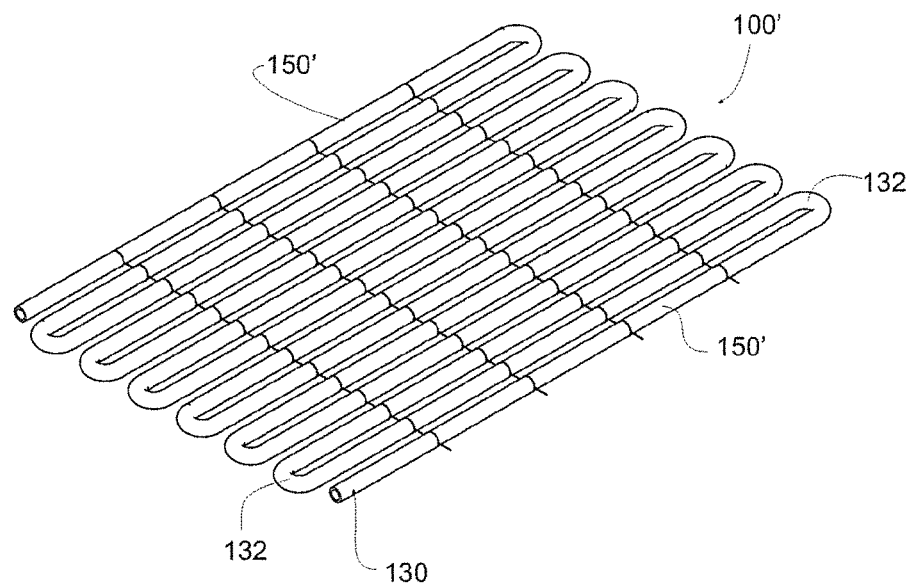
FIG. 5 is a perspective view of an alternative hollow fiber mat wherein a continuous hollow fiber is woven back and forth to form a plurality of hollow fibers and FIG. 6 is a perspective view of a fiber mat with non-perpendicular warps.

Referring now to FIG. 5, an alternative mat is shown at 100'. This mat differs from the mat 100 in that the plurality of hollow fibers 150' are interconnected at their ends such that each is part of a continuous or generally continuous hollow fiber 130 that is woven or folded back and forth to form the plurality of hollow fibers 150'. As shown, this forms a plurality of folded or curved ends 132, which may be later cut off, either after forming the mat or after forming the bundle or after potting the bundle.

The methods described herein may be used in combination with the methods described in Applicant's reissue Patent and pending patent application. For example, the hollow fibers described herein may have support fibers disposed therein during part of the method, with the support fibers being removed in accordance with the teaching of the incorporated references. The term "hollow fiber" as used herein encompasses a hollow fiber with a support fiber disposed therein during at least part of the inventive method.

Figure 6:
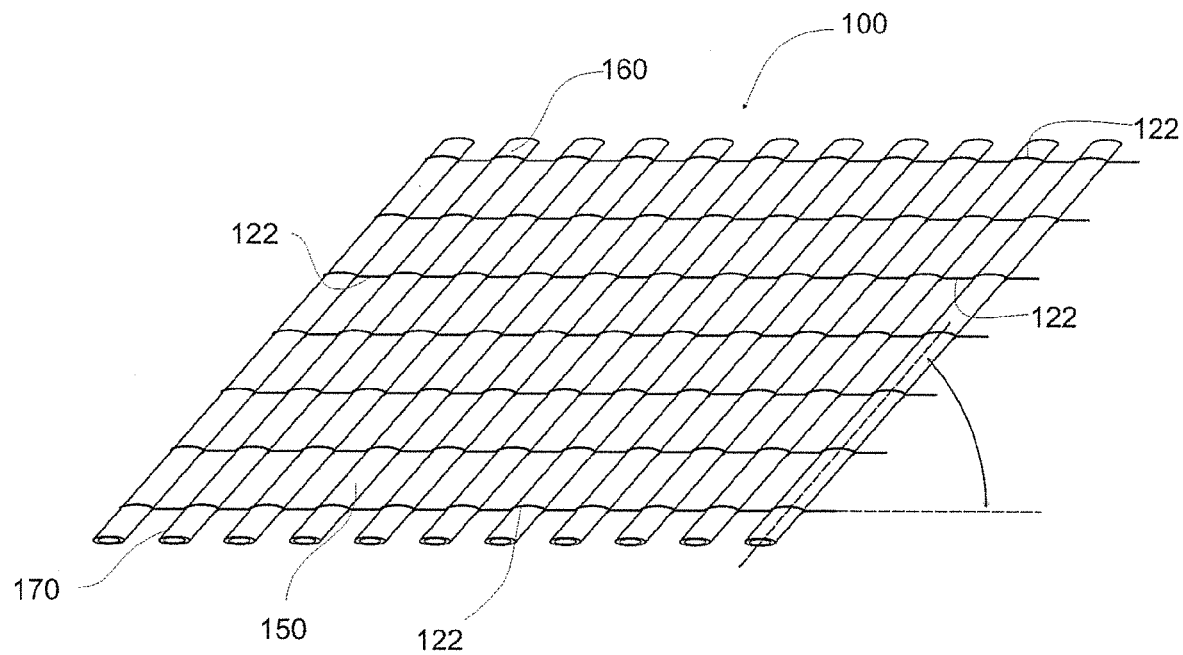

The present invention may further include the step of forming the hollow fiber mat shown in FIG. 1 or 5, such as by weaving, knitting or other processes. Also, while the weft and warp are illustrated as being generally perpendicular to each other, they may be provided at other angles, such as shown at 122 in FIG. 6.

As will be clear to those of skill in the art, the present invention may be altered in various ways without departing from the scope of teaching of the present invention. As such, it is the following claims which define the scope of the present invention.

The invention claimed is:

1. A method of forming hollow fiber bundles, comprising:
   providing at least one mat having a plurality of hollow fibers forming a weft and a plurality of soluble fibers forming a warp, each hollow fiber extending between a first side and an opposed second side of the mat;
   bundling the at least one mat so as to form a bundle with the first side of the mat defining a first end of the bundle and the second side of the mat defining a second end of the bundle;
   potting at least a portion of the bundle so as to substantially fix a position of the hollow fibers relative to each other; and
   at least partially dissolving the soluble fibers so as to remove the soluble fibers from the bundle.

2. A method of forming hollow fiber bundles in accordance with claim 1, wherein:
   the step of potting at least a portion of the bundle comprises:
   potting the first end of the bundle so as to form a first potted end; and
   potting the second end of the bundle so as to form a second potted end.

3. A method of forming hollow fiber bundles in accordance with claim 1, wherein:

the at least one mat further comprises at least some nonsoluble fibers forming a further warp such that the nonsoluble fibers remain in the bundle after the soluble fibers are removed.

4. A method of forming hollow fiber bundles in accordance with claim 1, wherein:
the step of providing the at least one mat further comprises forming the at least one mat.

5. A method of forming hollow fiber bundles in accordance with claim 1, wherein:
the weft and warp are perpendicular to each other.

6. A method of forming hollow fiber bundles in accordance with claim 1, wherein:
the weft and warp are at an angle different from 90 degrees relative to each other.

7. A method of forming hollow fiber bundles in accordance with claim 1, wherein:
the soluble fibers are water soluble fibers and the dissolving step comprises at least partially dissolving the fibers in water.

8. A method of forming hollow fiber bundles in accordance with claim 1, wherein:
the plurality of hollow fibers comprises a plurality of individual hollow fibers each with opposed ends.

9. A method of forming hollow fiber bundles in accordance with claim 1, wherein:
the plurality of hollow fibers comprise a plurality of interconnected fibers formed from a continuous hollow fiber folded back and forth on itself.

* * * * *